United States Patent Office 3,350,268
Patented Oct. 31, 1967

3,350,268
COMPOSITIONS AND METHOD OF EMPLOYING
PHENOTHIAZINE SALTS
Harry L. Yale, New Brunswick, and Reynold C. Merrill,
Short Hills, N.J., assignors, by mesne assignments, to
E. R. Squibb & Sons, Inc., New York, N.Y., a corporation of Delaware
No Drawing. Filed July 1, 1965, Ser. No. 468,975
The portion of the term of the patent subsequent to
July 13, 1982, has been disclaimed and dedicated
to the Public
9 Claims. (Cl. 167—65)

This application is a continuation-in-part of application Ser. No. 426,671, filed Jan. 19, 1965, which in turn is a division of application, Ser. No. 254,459, filed Jan. 28, 1963, now Patent No. 3,194,733, granted July 13, 1965 which in turn is a continuation-in-part of application, Serial No. 105,548, filed April 26, 1961, and now abandoned.

This invention relates to new substantially anhydrous liquid pharmaceutical compositions containing acid-addition salts of esters of phenothiazines, and to methods of using the same.

The therapeutically active compounds used in the compositions of this invention include non-toxic acid-addition salts of phenothiazines of the general Formula I:

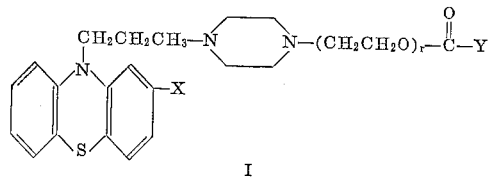

I wherein $r$ is 1 or 2; X is hydrogen, halogen (preferably chloro), trifluoromethyl, lower alkyl, lower alkoxy, lower alkanoyl, lower alkyl mercapto, trifluoromethylmercapto, and lower alkylsulfonyl (preferably methylsulfonyl); and Y is higher alkyl, higher alkenyl, higher alkynyl, aryl, ω-carbalkoxy (higher alkyl) or diphenyl (hydroxymethyl). The terms "higher alkyl," "higher alkenyl" and "higher alkynyl" as employed herein include both straight and branched chain radicals of more than five carbon atoms.

The term "ω-carbalkoxy (higher alkyl)" as employed herein, includes substituents derived from hydrocarbon carboxylic acids of more than six carbon atoms, and may be represented by the formula

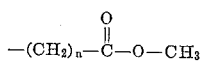

wherein $n$ is a positive integer of more than six and is preferably a positive integer of from 7 to 12. The term "aryl" as employed herein includes substituents derived from monocyclic and bicyclic aryl carboxylic acids, and may be substituted or unsubstituted and further may be represented by the formula

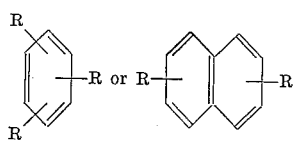

wherein each R may be hydrogen, lower alkyl, lower alkoxy or halogen (e.g. chloro or bromo) and R is preferably hydrogen, lower alkyl or lower alkoxy, and most preferably, R is hydrogen or lower alkyl. Examples of the aryl carboxylic acids which may be employed include benzoic, o-toluic, 2,6-dimethylbenzoic, 2,6-dimethylanisic, o-bromobenzoic, o-chlorobenzoic, 2,6-dichlorobenzoic, naphthoic acid, dimethylnaphthoic acid and other like acids.

The preferred compounds of this invention are those wherein X is chloro or trifluoromethyl and Y is a higher alkyl, higher alkenyl or higher alkynyl radical of from six to seventeen carbon atoms, lower alkyl- or lower alkoxy-substituted aryl or ω-carbalkoxy (higher alkyl) of less than thirteen carbon atoms. Particularly preferred are those compounds wherein X is trifluoromethyl and Y is a higher alkyl radical of from nine to fourteen carbon atoms.

Acids useful in preparing the acid-addition salts are any pharmaceutically-acceptable acid and include, inter alia, inorganic acids such as the hydrohalic acids (e.g. hydrochloric and hydrobromic acid), sulfuric acid, sulfamic, nitric acid and phosphoric acid, and organic acids such as oxalic, tartaric, citric, pamoic, fumaric, acetic, maleic, succinic acid and cyclohexylsulfamic acid.

The compounds used in preparing the compositions of this invention can be prepared by interacting a compound of the general Formula II:

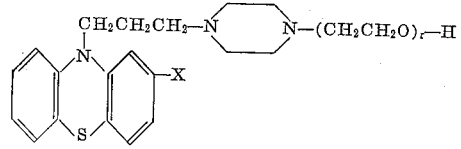

II wherein X and $r$ are as hereinbefore defined, with an acyl halide (preferably acyl chloride) of the formula: YCO-halide, wherein Y is as hereinbefore defined; the reaction preferably being conducted in an organic solvent, such as chloroform, for the reactants. When an acyl halide is employed, the ester is first formed as a monohydrohalide salt, and for convenience, is reacted with an additional equivalent of hydrogen halide to form the dihydrohalide salt which can be recovered and purified by recrystallization. Alternately, aqueous inorganic base may be added to the monohydrohalide salt to give the product as the base, which can be isolated by extraction into a suitable organic solvent, e.g. ether, benzene, etc., and then converted to a suitable salt. This is preferably conducted under anhydrous conditions. Among the suitable phenothiazine reactants may be mentioned: 10-[3-(2 - hydroxyethyl)piperazinopropyl] - phenothiazine; 10-[3-(2 - hydroxyethyl)piperazinopropyl]-2-halophenothiazines, such as 10 - [3 - (2-hydroxyethyl)piperazinopropyl] - 2 - chlorophenothiazine; 10-[3 - (2-hydroxyethyl)piperazinopropyl] - 2 - trifluoromethylphenothiazine; 10 - [3 - (2 - hydroxyalkoxyalkyl)-piperazinopropyl] - 2 - halo - phenothiazines, such as 10 - [3-(2-hydroxyethoxyethyl)piperazinopropyl] - 2 - trifluoromethylphenothiazine; 10-[3 - (2 - hydroxyethyl)piperazinopropyl] - 2 - (lower alkyl)phenothiazines, such as 10 - [3 - (2 - hydroxyethyl)piperazinopropyl] - 2-methylphenothiazine; 10 - [3 - (2 - hydroxyethyl)piperazinopropyl]-2-(lower alkoxy)phenothiazines, such as 10-[3-(2 - hydroxyethyl) - piperazinopropyl]-2-methoxyphenothiazine; 10 - [3 - (2 - hydroxyethyl)-piperazinopropyl]-2-(lower alkanoyl)phenothiazines, such as 10-[3-(2-hydroxyethyl)piperazinopropyl] - 2 - propionylphenothiazine; 10 - [3 - (2 - hydroxyethyl)piperazinopropyl]-2-(lower alkyl mercapto) - phenothiazines, such as 10-[3 - (2 - hydroxyethyl)piperazinopropyl] - 2 - methylmercaptophenothiazine; 10 - [3 - (2 - hydroxyethyl)piperazinopropyl] - 2 - trifluoromethylmercaptophenothiazine and 10 - [3 - (2 - hydroxyethyl)piperazinopropyl] - 2 - methylsulfonylphenothiazine.

Among the suitable acyl halide reactants may be mentioned the acyl chlorides of higher alkanoic acids, such as heptanoic acid, octanoic acid, 2-ethylheptanoic acid, decanoic acid, 2,2-diethylbutyric acid, capric acid, lauric acid, tridecylic acid, myristic acid, palmitic acid, and stearic acid; the acyl chlorides of higher alkenoic acids, such as 2-heptenoic acid, 2-nonenoic acid, citronellic acid, undecylenic acid and oleic acid; the acyl chlorides of the alkynoic acids, such as heptynoic acid, octynoic acid, nonynoic acid, decynoic acid, dodecynoic acid, tridecynoic acid and octadecynoic acid; the acyl chlorides of the alkadienoic acids, such as heptadienoic acid, octadienoic acid, (alkyl)octadienoic acid (e.g. 7-methyl-octadienoic acid), and nonadienoic acid; the acyl chlorides of the carboalkoxyalkanoic acids, such as carbomethoxyoctanoic acid, carbomethoxydecanoic acid and carbomethoxyundecanoic acid; the acyl chlorides of aryl carboxylic acids, such as benzoic acid, o-toluic acid, dimethylbenzoic acid, dimethylanisic acid, o-bromobenzoic acid, o-chlorobenzoic acid, naphthoic acid, dimethylnaphthoic acid, benzilic acid and dichlorobenzoic acid; the acyl chlorides of the carbalkoxy alkenoic acids such as ω-carbomethoxyundecylenic acid, ω-carbomethoxydodecylenic acid; and the acyl chlorides of the carboalkoxyalkynoic acids, such as ω-carbomethoxyundecylynic acid, ω-carbomethoxydodecylynic acid, and other like acids.

All of the acyl halides described hereinbefore may be prepared by heating an acid of the formula Y-COOH, wherein Y is as hereinbefore defined with two parts by weight, of a thionyl halide, preferably thionyl chloride or thionyl bromide, alone, or in the presence of an anhydrous solvent, such as chloroform or benzene, under reflux for a period of about three hours, concentrating to remove the excess thionyl halide (and any solvent present), and then distilling to obtain the resultant acyl halide, Y-CO-halide, wherein Y is as hereinbefore defined.

In addition to the foregoing general procedure, to prepare compounds of Formula I, alternate procedures may be employed, as shown in the examples following.

To prepare the compositions of this invention, the phenothiazine compounds, in the form of their acid-addition salts, are suspended in a sterile, non-toxic, parenterally acceptable, substantially anhydrous liquid vehicle. For prolonged action, the compounds are formulated in an oil such as peanut oil, sesame oil, cottonseed oil, corn oil, soybean oil, synthetic glycerol esters of long chain fatty acids, and mixtures of these and other oils; the compounds preferably being present in a concentration to give about 20 mg. to about 300 mg. of the compound per ml. The preferable route of administration of these formulations is subcutaneous or intramuscular.

It has surprisingly been found that such formulations provide long acting tranquilizing activity, when administered parenterally, even when compared with corresponding formulations of solutions of the free bases in the same anhydrous vehicles. Thus, for example, whereas a solution of 25 mg. of the heptanoic acid ester of 10-[3-(2 - hydroxyethyl)piperazinopropyl] - 2 - trifluoromethylphenothiazine in 1 ml. of sesame oil, when administered subcutaneously or intramuscularly, has a duration of activity of about 14 days, a suspension of the equivalent quantity of the dihydrochloride salt of the heptanoic acid ester of 10-[3-(2 - hydroxyethyl)piperazinopropyl] - 2 - trifluoromethylphenothiazine in the same amount of sesame oil, when administered subcutaneously or intramuscularly, has a duration of activity of about 28 days, or approximately twice as long.

The following examples illustrate the invention (all temperatures being in centigrade):

EXAMPLE 1

*Heptanoic acid ester of 10-[3-(2-hydroxyethyl)piperazinopropyl]-2-trifluoromethylphenothiazine dihydrochloride*

To a stirred solution of 30.6 g. of 10-[3-(2-hydroxyethyl)piperazinopropyl]-2-trifluoromethylphenothiazine in 300 ml. of dry chloroform is added, dropwise, 11.9 g. of heptanoyl chloride in 50 ml. of dry chloroform. Subsequently, the reaction mixture is stirred and heated under reflux for five hours, cooled, and shaken with 5% aqueous hydrochloric acid. The dried chloroform solution is concentrated to about 50 ml., cooled and diluted with about 450 ml. of anhydrous ether. To this cooled solution is added about 10 ml. of ethereal hydrogen chloride. The crystalline solid which separates is boiled for about five minutes with 200 ml. of benzene. The solid first dissolves and then crystallizes from the boiling mixture. The cooled mixture is filtered, and the solid recrystallized from methyl ethyl ketone to give about 19.6 g. of the product, M.P. about 184–185° (dec.).

Similarly, by substituting an equivalent amount of the following acyl chlorides for the heptanoyl chloride in Example 1, the dihydrochloride salt of the indicated ester is obtained:

| Acyl chloride: | Ester |
| --- | --- |
| Octanoyl chloride | Octanoic. |
| Lauroyl chloride | Lauric. |
| Stearoyl chloride | Stearic. |
| 2-heptenoyl chloride | 2-heptenoate. |
| 2-nonenoyl chloride | 2-nonenoate. |
| Citronelloyl chloride | Citronellic. |
| Undecylenoyl chloride | Undecylenic. |
| Heptadienoyl chloride | Heptadienic. |
| Heptynoyl chloride | Heptynoic. |
| Dodecynoyl chloride | Dodecynoic. |
| Benzoyl chloride | Benzoic. |
| Naphthoyl chloride | Napthoic. |
| Carbomethoxyundecylenoyl chloride | Carbomethoxyundecylenic. |
| Carbomethoxyundecanoyl chloride | Carbomethoxyundecanoic. |
| Carbomethoxyundecylynoyl chloride | Carbomethoxyundecylynic. |

Similarly, following the procedure set forth in Example 1, but substituting an equivalent amount of 10-[3-(2-hydroxyethoxyethyl)piperazinopropyl] - 2 - trifluoromethylphenothiazine for the 10-[3-(2-hydroxyethyl)piperazinopropyl]-2-trifluoromethylphenothiazine yields the dihydrochloride salt of the heptanoic acid ester of 10-[3-(2-hydroxyethoxyethyl)piperazinopropyl] - 2 - trifluoromethylphenothiazine.

EXAMPLE 2

*2,2-diethylbutyric acid ester of 10-[3-(2-hydroxyethyl)piperazinopropyl]-2-trifluoromethylphenothiazine salt with two moles of maleic acid*

(a) To 89.3 g. of 10-[3-(2-hydroxyethyl)piperazinopropyl]-2-trifluoromethylphenothiazine in one liter of dry chloroform is added, dropwise, 33.8 g. of 2,2-diethylbutyroyl chloride in 100 ml. of dry chloroform. The mixture is then refluxed for two hours and concentrated until free of chloroform. The residual oil is added to a suspension of 40 g. of sodium bicarbonate in 400 ml. of ice water and 500 ml. of ether. The mixture is shaken carefully until no further evolution of carbon dioxide occurs, the ether layer is separated, dried and concentrated to give 2,2-diethylbutyric acid ester of 10-[3-(2-hydroxyethyl)piperazinopropyl] - 2 - trifluoromethylphenothiazine, as a pale yellow oil.

(b) 11.6 g. of the product obtained in step (a) is dissolved in 50 ml. of dry chloroform, the solution is cooled, and a saturated solution of 4.64 g. of maleic acid in dry acetone is added dropwise. The precipitated solid is filtered and recrystallized from dry acetone to give the 2,2-diethylbutyric acid ester of 10-[3-(2-hydroxyethyl)piperazinopropyl] - 2 - trifluoromethylphenothiazine salt with two moles of maleic acid, having a melting point of about 167–168° C.

EXAMPLE 3

Stearic acid ester of 10-[3-(2-hydroxyethyl)piperazinopropyl]-2-trifluoromethylphenothiazine dihydrochloride

(a) Following the procedure set forth in Example 2, step (a), but substituting 57.5 g. of stearoyl chloride for 2,2-diethylbutyroyl chloride yields the stearic acid ester of 10-[3-(2 - hydroxyethyl)piperazinopropyl]-2-trifluoromethylphenothiazine, first as a pale yellow oil which later crystallizes spontaneously to a solid, having a melting point of about 33–34° C.

(b) 14.1 g. of the product of step (a) is dissolved in 50 ml. of dry chloroform, the solution is cooled, and 40 ml. of a 1 molar solution of hydrogen chloride in anhydrous ether is added, dropwise, with stirring. The clear solution which forms is evaporated free of solvents and the residual oil induced to granulate. The solid is recrystallized from anhydrous acetone-ether to yield stearic acid ester of 10-[3-(2-hydroxyethyl)piperazinopropyl]-2-trifluoromethylphenothiazine, dihydrochloride, having a melting point of about 80–81° C.

EXAMPLE 4

10-undecenoic acid ester of 10-[3-(2-hydroxyethyl)piperazinopropyl] - 2 - trifluoromethylphenothiazine dihydrochloride

Following the procedure set forth in Example 2, step (a), but substituting 41.5 g. of 10-undecenoyl chloride for 2,2-diethylbutyroyl chloride yields the 10-undecenoic acid ester of 10-[3-(2-hydroxyethyl)piperazinepropyl]-2-trifluoromethylphenothiazine, as a pale yellow oil. Treatment of 12.4 g. of this material according to the procedure set forth in step (b) in Example 3, yields the dihydrochloride salt of the 10-undecenoic acid ester of 10 - [3 - (2 - hydroxyethyl)piperazinopropyl]-2-trifluoromethylphenothiazine, having a M.P. of about 153–155° C.

EXAMPLE 5

Decanoic acid ester of 10-[3-(2-hydroxyethyl)piperazinopropyl] - 2 - trifluoromethylphenothiazine dihydrochloride

Following the procedure set forth in Example 2, step (a), but substituting 39.3 g. of decanoyl chloride for 2,2-diethylbutyroyl chloride, there is obtained the decanoic acid ester of 10-[3-(2-hydroxyethyl)piperazinopropyl]-2-trifluoromethylphenothiazine, as a pale yellow oil. Treatment of 12.1 g. of this material according to the procedure set forth in step (b) of Example 3 yields the dihydrochloride salt of 10-decanoic acid ester of 10 - [3 - (2 - hydroxyethyl)piperazinopropyl]-2-trifluoromethylphenothiazine, having a M.P. of about 175–176° C.

EXAMPLE 6

2,6-dimethyl-p-anisic acid ester of 10-[3-(2-hydroxyethyl)piperazinopropyl]-2-trifluoromethylphenothiazine dimaleate

(a) To 21.9 g. of 10-[3-(2-hydroxyethyl)piperazinopropyl]-2-trifluoromethylphenothiazine in 250 ml. of dry benzene is added 7.1 g. of thionyl chloride. The mixture is kept overnight, heated for 3 hours under reflux, cooled and treated with an excess of ethereal hydrogen chloride. The precipitated solid is filtered and recrystallized from absolute ethanol-anhydrous ether to give 18.4 g. of 10-[3-(2-chloroethyl)piperazinopropyl] - 2 - trifluoromethylphenothiazine as the dihydrochloride, M.P. 224–225° (dec.).

(b) To 2.7 g. of potassium 2,6-dimethyl-p-anisoate in 25 ml. of N,N-dimethylformamide is added 4.38 g. of 10-[3-(2-chloroethyl)piperazinopropyl] - 2 - trifluoromethylphenothiazine, the mixture is stirred and heated for 5 hours at 100°, cooled, diluted with water and the pH adjusted to 10 with 10% aqueous sodium hydroxide solution. The mixture is extracted with ether and the ether extracts are dried and concentrated to yield the 2,6-dimethyl-p-anisic acid ester of 10-[3-(2-hydroxyethyl)-piperazinopropyl]-2 - trifluoromethylphenothiazine. This product in 50 ml. of anhydrous ether is then reacted with 1.5 g. of maleic acid in 10 ml. of dry acetone, and the resultant precipitated product is filtered to yield the dimaleic acid salt of 2,6-dimethyl-p-anisic acid ester of 10-[3-(2 - hydroxyethyl) - piperazinopropyl] - 2 - trifluoromethylphenothiazine, having a M.P. of about 160–161° C.

Following the procedure set forth in Example 6, but substituting an equivalent amount of 10 - [3 - (2 - chloroethoxyethyl) - piperazinopropyl] - 2 - trifluoromethylphenothiazine for 10-[3-(2 - chloroethyl)piperazinopropyl]-2-trifluoromethylphenothiazine, yields the 2,6 - dimethyl-p-anisic acid ester of 10-[3-(2-hydroxyethoxyethyl)piperazinopropyl]-2 - trifluoromethylphenothiazine, dimaleate.

Similarly, following the procedure set forth in Example 6, but substituting equivalent amounts of sodium heptanoate; potassium naphthoate; potassium benzilate, sodium heptynoate; potassium-2-heptenoate; sodium 8-carbomethoxy octanoate; potassium - 2,6 - dimethylbenzoate; sodium 2,6-dichlorobenzoate; potassium o-bromobenzoate; and potassium-o-chlorobenzoate for potassium 2,6-dimethyl-p-anisoate, yields respectively, the dimaleate salt of the heptanoic acid; naphthoic acid; benzilic acid, heptynoic acid; heptenoic acid; 8-carbomethoxyoctanoic acid; 2,6-dimethylbenzoic acid; 2,6-dichlorobenzoic acid; o-bromobenzoic acid; and o-chlorobenzoic acid esters of 10-[3-(2-hydroxyethyl)piperazinopropyl] - 2 - trifluoromethylphenothiazine.

EXAMPLE 7

8-carbomethoxyoctanoic acid ester of 10-[3-(2-hydroxyethyl) - piperazinopropyl] - 2 - trifluoromethylphenothiazine dimaleate

Following the procedure set forth in step (a) of Example 2, but substituting 42 g. of 8-carbomethoxyoctanoyl chloride for the 2,2-diethylbutyroyl chloride, there is obtained the 8-carbomethoxyoctanoic acid ester of 10-[3-(2-hydroxyethyl) - piperazinopropyl] - 2 - trifluoromethylphenothiazine, as a pale yellow oil. Treatment of 12.4 g. of this product in accordance with the procedure set forth in step (b) of Example 2 yields the dimaleic salt of 8-carbomethoxyoctanoic acid ester of 10-[3-(2-hydroxyethyl)piperazinopropyl] - 2 - trifluoromethylphenothiazine, having a M.P. about 157–158° C. (dec.).

Similarly, following the procedure of Example 7, but substituting an equivalent amount of 10-carbomethoxydecanoyl chloride and 11-carbomethoxyundecanoyl chloride, for 8-carbomethoxyoctanoyl chloride the dimaleate salts of the respective 10-carbomethoxydecanoic acid; and 11-carbomethoxyundecanoic acid esters of 10-[3-(2-hydroxyethyl)piperazinopropyl] - 2 - trifluoromethylphenothiazine are obtained.

EXAMPLE 8

Parenteral formulation A

50 g. of the dihydrochloride salt of the decanoic acid ester of 10-[3 - (2 - hydroxyethyl)piperazinopropyl] - 2-trifluoromethylphenothiazine obtained as in Example 5 is suspended in 1000 ml. of sesame oil, U.S.P. The suspension is sterile filtered and packaged aseptically for parenteral administration.

EXAMPLE 9

Parenteral formulation B

A suspension of 56 g. of micronized heptanoic acid ester of 10-[3 - (2 - hydroxyethyl)piperazinopropyl] - 2-trifluoromethylphenothiazine, dihydrochloride, hemihydrate, prepared as in Example 1, 0.36 g. of lecithin, N.F., 0.18 g. of Tween 80 and 1.68 g. of aluminum monostearate (purified), diluted to 1000 ml. with sesame oil is prepared under sterile conditions and packaged aseptically for parenteral administration.

EXAMPLE 10

*Parenteral formulation C*

A suspension of 50 g. of the dihydrochloride salt of the 10-undecenoic acid ester of 10-[3-(2-hydroxyethyl)piperazinopropyl]-2-trifluoromethylphenothiazine, 1.5 g. aluminum monostearate (purified) diluted to 1000 ml. with sesame oil, U.S.P., is sterile filtered and packaged aseptically for parenteral administration.

This invention may be variously otherwise embodied within the scope of the appended claims.

What is claimed is:

1. A pharmaceutical composition for parenteral administrtaion having prolonged duration of activity in the treatment of mental disorders which comprises a suspension of a physiologically active, non-toxic acid-addition salt of the compound of the formula

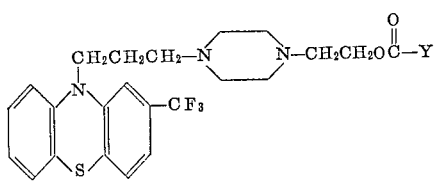

wherein Y is a higher alkyl, higher alkenyl or higher alkynyl radical of from six to seventeen carbon atoms, in a stable, non-toxic pharmaceutically acceptable, substantially anhydrous liquid carrier.

2. A composition as in claim 1 wherein Y is higher alkyl of six to seventeen carbon atoms.

3. The composition of claim 1, wherein the liquid carrier is selected from the group consisting of vegetable oils, synthetic glycerol esters of long chain fatty acids and mixtures thereof.

4. The composition of claim 1, wherein the physiologically active compound is at a concentration of about 20 mg. to about 300 mg. per ml.

5. A pharmaceutical composition for parenteral administration having prolonged duration of activity in the treatment of mental disorders which comprises a physiologically active, non-toxic acid-addition salt of the heptanoic acid ester of 10-[3-(2-hydroxyethyl)piperazinopropyl]-2-trifluoromethylphenothiazine suspended in a stable, non-toxic, pharmaceutically acceptable, substantially anhydrous liquid carrier at a concentration of about 20 mg. to about 300 mg. of the salt per ml. of the carrier.

6. A pharmaceutical composition for parenteral administration having prolonged duration of activity in the treatment of mental disorders which comprises the dihydrochloride of the heptanoic acid ester of 10-[3-(2-hydroxyethyl)piperazinopropyl]-2 - trifluoromethylphenothiazine suspended in a stable, non-toxic, pharmaceutically acceptable, substantially anhydrous liquid carrier at a concentration of about 20 mg. to about 300 mg. of the hydrochloride per ml. of the carrier.

7. A pharmaceutical composition for parenteral administration having prolonged duration of activity in the treatment of mental disorders which comprises a physiologically active, non-toxic acid-addition salt of the decanoic acid ester of 10-[3-(2-hydroxyethyl)piperazinopropyl]-2-trifluoromethylphenothiazine suspended in a stable, non-toxic, pharmaceutically acceptable, substantially anhydrous liquid carrier at a concentration of about 20 mg. to about 300 mg. of the salt per ml. of the carrier.

8. A pharmaceutical composition for parenteral administration having prolonged duration of activity in the treatment of mental disorders which comprises the dihydrochloride of the decanoic acid ester of 10-[3-(2-hydroxyethyl)piperazinopropyl] - 2 - trifluoromethylphenothiazine suspended in a stable, nontoxic, pharmaceutically acceptable substantially anhydrous liquid carrier at a concentration of about 20 mg. to about 300 mg. of the hydrochloride per ml. of the carrier.

9. A method of tranquilizing patients which comprises parenterally administering to said patients an effective amount of the composition of claim 1.

References Cited

UNITED STATES PATENTS 3,194,733   7/1965   Yale _____ 167—65

ALBERT T. MEYERS, *Primary Examiner.*

J. S. LEVITT, SAM ROSEN, *Examiners.*

S. J. FRIEDMAN, *Assistant Examiner.*